July 12, 1960   B. POLLICK ET AL   2,944,476
PHOTOGRAPHIC SHUTTER
Filed April 4, 1956   2 Sheets-Sheet 1

INVENTORS:
Berthold Pollick &
Raymond G. Hennessey,

BY Homer R. Montague
ATTORNEY

July 12, 1960  B. POLLICK ET AL  2,944,476
PHOTOGRAPHIC SHUTTER
Filed April 4, 1956  2 Sheets-Sheet 2

INVENTORS:
Berthold Pollick &
Raymond G. Hennessey,
BY Homer R. Montague
ATTORNEY

United States Patent Office 2,944,476
Patented July 12, 1960

2,944,476

PHOTOGRAPHIC SHUTTER

Berthold Pollick, Brooklyn, and Raymond G. Hennessey, Centerport, N.Y., assignors to Fairchild Camera and Instrument Corporation, a corporation of Delaware Filed Apr. 4, 1956, Ser. No. 576,180

9 Claims. (Cl. 95—55)

This invention pertains to photographic shutters, and in particular to an improved form of curtain shutter capable of making exposures at very high speeds and at intervals which can follow one another very rapidly.

Shutters in which the exposure is made by moving an opaque curtain (containing a slit or other aperture) across the light path of a camera are well known. While often used in or adjacent the focal plane of the camera, most types of curtain shutters will also function after a fashion when disposed at other locations in the optical path. By making the exposure slit relatively narrow, quite high effective exposure speeds can be attained, although the highest speeds are necessarily accomplished by a reduction in the photographic efficiency of the exposure. The most common variety of curtain shutter utilizes a highly flexible curtain which is attached to reels lying on opposite sides of the optical path of the camera, with one or more slits spaced along the length of the curtain. To make an exposure, a selected slit is caused to travel across the optical path by driving the reels in the appropriate directions to produce this travel. In general, energy is required to accelerate the reels themselves, as well as the mass of the curtain, so that the maximum travel speed of the shutter curtain is much less than would be possible if all of the available energy were devoted to accelerating the shutter curtain itself. Some energy loss also occurs in the reeling up and unreeling of the curtain convolutions.

Shutters are also known in which a flat rigid plate is caused to slide across an optical path, without being rolled up upon rollers. For rigidity, such shutter elements have had to be quite massive, so that high speeds have not generally been possible with these constructions.

The present invention provides a photographic shutter in which a relatively stiff shutter element consisting of a single one-piece sheet of suitable opaque material, for example of thin sheet steel, has a single exposure aperture or slit disposed transversely of the sheet length, together with means for propelling or projecting this shutter element at an extremely high speed along such a path that the slit progressively exposes a film to the light directed thereat. The problem of attaining a very high travel speed for the shutter is in part solved by the low mass of this thin and light element, and in part by the manner in which the propelling force is applied to the shutter element. To effect this propulsion, at least one continuously rotating roller is maintained in a position slightly spaced from the surface of the shutter, and at the desired instant this roller is brought into firm frictional contact with the shutter surface. Because of the fact that the job of bringing the roller and its driving parts to high speed has been accomplished long before the instant when the exposure commences, rather than during the exposure period, it is possible to impart to the relatively light shutter element itself an acceleration far in excess of that contemplated or possible with previously known constructions. After the shutter element has moved at high speed a sufficient distance to complete the exposure, or at least has attained sufficient momentum to carry it such a distance without significant loss of speed, its trailing edge is allowed to pass from beneath the still-rotating driving roller. It then becomes necessary to bring it to rest within a reasonable travel distance and time. The one-piece nature of the metallic shutter element permits this to be done without injury to the parts by the use of a wedge-action snubber which acts principally upon the flat surface of the element, as opposed to bumpers or the like disposed in the path of movement. Preferably, the snubber of the present invention comprises a brush arrangement which exerts a wiping action upon the shutter surface, so that the decelerative forces are distributed uniformly across the width of the element and during a substantial portion of the stopping time.

Since the rapid acceleration of the shutter element or sheet requires good frictional contact between the propelling roller and the sheet surface, it is necessary to provide some backing device in a position opposite to the driving roller on the other side of the shutter sheet. This backing element may be a second roller, but since if idle it would be at a standstill when the travel of the shutter commenced, and would impose a serious retarding effect, it would be necessary to have it also power driven so as to tend to drive the sheet in the same direction as the first roller. Thus, the configuration would be that of two counter-rotating rollers normally held apart and allowed to spring into simultaneous contact with opposite surfaces of the sheet at the instant the exposure is to be initiated. In a preferred alternative configuration, a single frictional drive roller is utilized, and a relatively smooth backing plate is provided to maintain the shutter sheet in position to be contacted by the roller. In this form, the sheet is preferably treated on the surface which will contact the backing plate, as by a coating of friction-reducing plastic or the like. Also, in this case, the backing plate is preferably relieved by grooves running in the direction of sheet travel, and the drive roller is peripherally grooved in a complementary fashion; the groove depths are so chosen that when the propelling roller has moved its maximum extent toward the backing plate after the trailing edge of the shutter has left the roller, the material forming the roller will remain clear of the backing plate. In this way, these parts are protected against injury between exposures, and the roller turns at its top speed at all times.

It is to be noted that the rapid acceleration of the shutter depends upon achieving a high coefficient of friction between the roller and one surface of the shutter, and a low coefficient of friction between the backing plate and the opposite side of the shutter.

By employing the above combination of features, the invention provides a shutter whose performance conspicuously exceeds that of previously known curtain or sliding type arrangements. Purely by way of example, a shutter suitable for a 2¼ inch square exposure format, employing a slit ⅒ inch wide, can easily achieve a motion-stopping speed of ¼₀₀₀ second. Moreover, the shutter can readily be recycled to produce eight or more complete exposures per second.

Depending upon the particular application, the actual design of the complete shutter equipment under the principles of this invention may take various forms. Thus, where it is permissible to make successive exposures by driving the shutter element successively in opposite directions across the optical path of the camera, duplicate driving and snubbing devices may be provided at opposite sides of the optical path, and operated in alternation. The film of the camera will in this case always be occluded by the opaque portions of the shutter element lying on either side of the exposure slit, except for the short interval when an exposure is being made; hence, the film may be advanced at such times without the necessity for "capping" the shutter during film advance, Alternatively, by means to be described in detail below, a single driving arrangement may be provided to one side of the optical path (and a single snubbing arrangement at the other), the shutter element being returned to the driving end of its travel path in the interval between exposures. By making this returning movement of the shutter element synchronous with the film feed, and where the shutter lies closely adjacent the film, it can easily be arranged that only a small lateral strip of the film lying between successive exposure frames will be exposed to fogging light. In either case, the necessity for a separate capping shutter is eliminated.

A further important advantage of a shutter constructed in accordance with the present invention lies in the fact that the exposure time can be adjusted over a substantial range by adjusting the speed of the constantly turning drive roller. This is so because the force applied to the shutter element by the drive roller can be very large compared to the mass of the shutter element, so that the shutter element is accelerated very rapidly to a linear velocity corresponding to the peripheral speed of the roller, and then moves across the exposure area at a speed which is nearly identical with the peripheral speed of the said roller. By adjusting the speed of the roller, the speed of travel of the shutter can be selected over a considerable range. Exposure adjustment can also be selected by substituting alternative shutter elements having exposure slits of different widths as measured in the direction of shutter travel. Such substitution is greatly facilitated because of the fact that the sheet-like shutter element is completely free of attachments except during the exposure period. When carried in lateral guideways, for example, the sheet can readily be removed by sliding it endwise past any mechanical stop or other obstruction that may lie in its path. A substitute shutter having a slit of different width can thus be installed in a matter of seconds. This capability provides an accuracy and constancy of exposure calibration that cannot be realized by the complicated prior art provision of means for adjusting the slit width in a curtain shutter or shutter of the sliding type.

It is accordingly a principal object of the invention to provide a photographic shutter capable of high speed and good photographic efficiency, and in which the exposure interval can be precisely regulated by a simple mechanism.

It is a further object of the present invention to provide a shutter of the above type which can be cycled rapidly for successive exposures; that is, one which can be readied for a following exposure in a relatively brief period of time. This characteristic is very desirable where successive short exposures are required to follow one another at close intervals.

Still another object of the invention is to provide improved means for making successive exposures upon a strip of film or the like, without necessitating the capping of the shutter during the shutter-setting interval between exposures.

A further object of the invention is to provide an improved method for the simultaneous feeding of film and resetting of a shutter, whereby the desired exposures can be made seriatim without any danger of fogging during the shutter setting portion of the cycle, merely by sacrificing a minor portion of the usable film area which would normally be wasted in conventional methods of operation.

With the above objects of the invention in mind, the invention itself will best be understood by referring now to the following detailed specification of certain preferred mechanical embodiments thereof, and illustrating the practice of the novel film and shutter drive method. The descriptive portion of the specification is illustrated by the accompanying drawings, forming a part hereof, in which.

Figure 1:
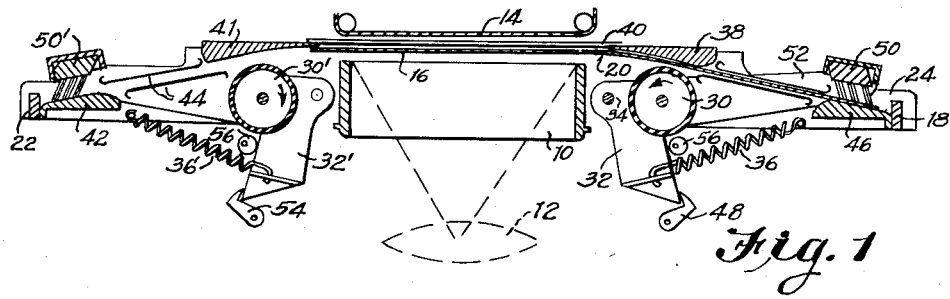
Fig. 1 is a schematic longitudinal sectional view of essential portions of a camera embodying one form of the improved shutter.

Referring now to Figs. 1 to 4 of the drawings, there will be described a first form of the invention in which the principles of the invention are incorporated in an arrangement for making successive exposures during successive opposite movements of the shutter element. To this end, duplicate driving rollers are provided at opposite sides of the exposure opening, and duplicate snubbing or braking arrangements are also included. In Fig. 1, which is a longitudinal sectional view omitting conventional parts not essential to an understanding of the invention, numeral 10 designates a light tunnel arranged to pass rays proceeding from a camera lens 12 to the strip film indicated at 14. The shutter is shown in closed condition, the relatively stiff shutter blade element being indicated by numeral 16, and lying in this condition with its righthand end at or adjacent the stop 18. The exposure slit 20 in shutter element 16 lies outside (to the right of) the light tunnel 10 or any equivalent picture-format defining means. Since shutter blade 16 is opaque except at the slit 20, no exposure will be made on film 14 in this position: the blade itself is preferably of clock-spring steel, about .002 inch thick, or equivalent fairly rigid material.

Figure 2:
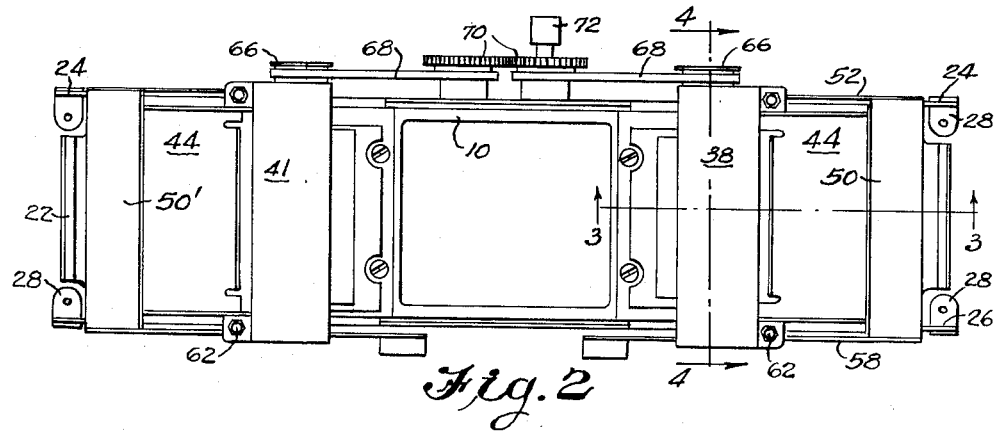
Fig. 2 is a plan view of the Fig. 1 arrangement.

In order to make an exposure, shutter element 16 is to be moved rapidly, and substantially in the direction of its length, to a position in which its left end will be at or near stop 22, and in so doing the slit 20 will traverse the light path from the lens to the film to make an exposure. The necessary mechanical parts to accomplish this end may be carried upon opposite longitudinal side plates of a main support frame, the rear side plate being indicated in Figs. 1 and 2 by numeral 24. As best shown in Fig. 2, the extremities of these side plates, (the front one being designated 26 in Fig. 2) may be provided with lugs 28 by which the entire shutter mechanism can be suitably mounted in a camera housing, not shown.

Returning now to Fig. 1, a frictional surfaced roller 30 is arranged to be constantly rotated in the direction of the arrow thereon, but normally maintained out of contact with shutter blade 16. The axle of roller 30 is carried at its opposite ends in pivoted plates of which one is indicated in Fig. 1 by numeral 32. Plate 32 is pivoted to the main frame side plates as at 34, and a spring 36 connects a downwardly extending leg of plate 32 to the side frame 24. Thus, the spring 36 will tend to urge plate 32 about its pivot 34 in the direction necessary to bring the surface of roller 30 into contact with the underside of shutter element 16. In the region of contact between roller 30 and the shutter element, the latter is maintained against deflection by a backing member 38, suitably shaped to cooperate with an edge guideway rail 40 to maintain the shutter element 16 in flat condition as it travels above the exposure aperture or tunnel 10. At the opposite side of the exposure aperture, the leading edge of shutter element 16 is guided by a similar backing member 41 in such a direction that said leading edge will ultimately travel above a second snubbing plate 42 at the left end of the shutter. The edge guide or rail 40 is of course duplicated at the front edge of the exposure aperture.

In the region between backing plate 41 and snubbing plate 42, suitable guide strips 44 are provided to ensure that the leading edge of the shutter element is not deflected from the desired path. Similar guides are provided at the opposite end of the shutter assembly, between the backing plate 38 and the snubber plate 46.

Fig. 1 shows the shutter element at rest and ready for making an exposure, the roller 30 being held out of contact with the shutter element as by a latch 48 suitably mounted on the camera or shutter framework, engaging a hooked portion of plate 32 and maintaining it in the position shown against the tension of spring 36. In this condition, fortuitous movements of the shutter element 16 are prevented by reason of the fact that a snubbing element in the nature of a bristle brush 50 is caused to bear down upon the shutter element 16. For this purpose, it is convenient to mount the snubber 50 upon an upward extension 52 of the same plate 32 which carries roller 30. It is clear from Fig. 1 that if latch 48 be released, spring 36 will turn plate 32 counterclockwise about pivot 34 to allow roller 30 (which is spinning at high speed) to contact the under surface of shutter element 16. The position of snubber 50 is selected so that the bristles of the brush leave their engagement with the shutter element just before the roller 30 first contacts the shutter. Hence at the instant the exposure is initiated, shutter 16 is free of all attachments and is therefore driven rapidly to the left. Preferably, the brush 50 has several rows of bristles extending across the entire width of shutter element 16, to provide maximum frictional resistance.

The condition of the corresponding parts at the left side of Fig. 1 is as already described for the righthand parts, latch 54 holding plate 32' against the tension of spring 36'. Hence, roller 30' will be in a downward position out of the path of shutter element 16, and the snubber 50' will also be lowered so that its bristles contact the snubbing plate 42. When the leading edge of plate 16 passes under these bristles, it is rapidly decelerated and is brought substantially to a complete stop before it strikes the bumper 22. The shutter element will be held in this position against accidental displacement, until latch 54 is released to initiate a following exposure when roller 30' (rotating opposite to roller 30) is allowed to drive the shutter element 16 to the right. The latches 48 and 54 may be operated manually or by suitable recycling cams to make a continuous series of exposures, it being understood that film 14 will be advanced by any desired or conventional means between the successive exposures. In order to reset the pivoted plates 32 and 32' against the tension of spring 36, 36', suitable cams 56 may be rotated to contact portions of the pivoted levers. These cams may be controlled by the same timing mechanism that actuates latches 48, 54, or they may be manually operated.

While Fig. 1 shows only the parts lying on one side of a longitudinal section line, it will be understood that many of these are duplicated at opposite lateral sides of the shutter frame. For example, snubber 50 is shown in Fig. 2 as carried by the upwardly extending portion 52 of one of the pivoted plates. Actually, snubber 50 is carried between the plate extension 52 and the duplicate plate extension 58, these extensions being bridged by the snubber 50 and if desired by other transverse structural members such as the one indicated by numeral 60 in the enlarged view of Fig. 3. The pivoted plates thus are related as the legs of a bail. For clarity, the shutter element 16 itself has been omitted in Fig. 2. It will be noted that when both the latches 48 and 54 are engaged with their respective swinging plates, the shutter element 16 can readily be removed endwise from either direction by removing the stop 18 or 22, and exerting sufficient pull to overcome the friction imposed by the respective snubber.

Figure 3:
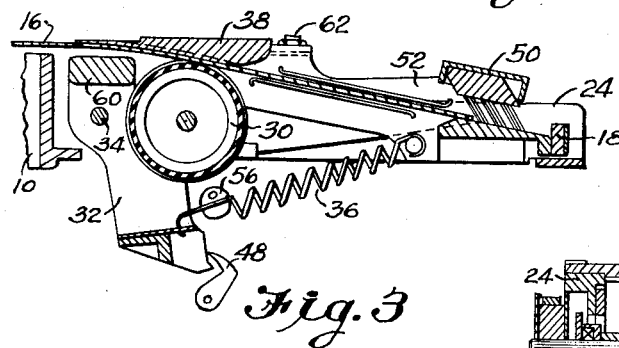
Fig. 3 is a somewhat enlarged fragmentary sectional view, taken along the line 3—3 of Fig. 2.
Figure 4:
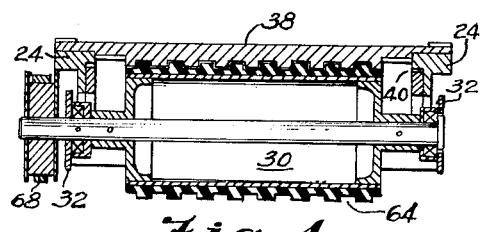
Fig. 4 is a similar sectional view taken along line 4—4 of Fig. 2.

Fig. 3 shows more clearly the backing plate 38 whose under surface contacting shutter element 16 is grooved in the direction of travel of the shutter, in a manner to be described. Each of the snubber-carrying extensions 52 is arranged to be limited in its upward movement by engaging a stop-screw 62, mounted on the fixed frame, so as to regulate the maximum extent of movement of roller 30 towards the backing plate 38. As better shown in Fig. 4, the frictional periphery of roller 30 has circumferential grooves 64, sized to receive lands constituting the under surface of backing plate 38. Screws 62 are adjusted so that the actual periphery of roller 30 cannot engage any part of the backing plate 38, as illustrated in Fig. 4. This prevents the roller 30 from being slowed down after the trailing edge of shutter element 13 passes out from under the backing plate 38. Fig. 4 also illustrates how the roller 30 or its shaft are mounted in bearings carried by the pivoted plates 32 for limited vertical movement with respect to the side frames 24. One of the lateral edge guideways 40 described above in connection with Fig. 1 is also designated in Fig. 4, these of course being duplicated at the other side of the shutter frame.

Means for driving the rollers 30 and 30' continuously in opposite directions are illustrated in Fig. 2. The respective roller shafts are shown as carrying pulleys 66 connected by belts 68 to pulley surfaces driven integrally with respective meshing gears 70. A drive motor 72 is indicated in conventional fashion to drive one of the meshing gears, whereby the rollers 30 and 30' will be constantly rotated in the desired directions.

It will be noted from what has been said above that the drive rollers operate upon the under surface of shutter element 16, while the backing plates 38, 40 contact only the upper surface. The under surface is therefore left plain, to provide good frictional engagement with the rubber or like surface of roller 30; the upper surface of shutter element 16 is preferably coated with a plastic or similar material exhibiting a low coefficient of friction with respect to the metal constituting backing plate 38. Such a material may be, for example, the polyamide resin marketed under the trade name "Teflon" by E. I. du Pont de Nemours & Co., Inc.

Figure 5:
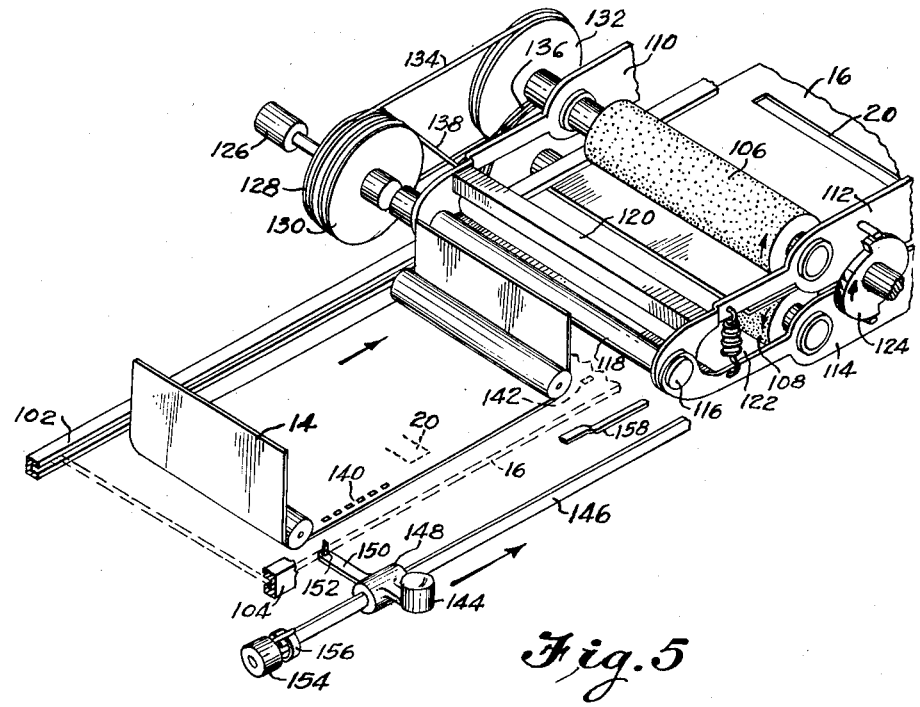
Fig. 5 is a schematic perspective view of a modified form of the invention.

A modified form of the invention, in which the shutter makes an exposure in only one direction of its travel, is illustrated in Fig. 5 of the drawings. In this figure, the film is again designated by numeral 14, and is shown as suitably guided to lie in an exposure plane just above shutter element 16 shown in full lines in position before starting an exposure and in dashed lines as it would appear when travelling across the exposure plate with its slit 20 midway thereof. The usual lens and other camera parts are omitted from this figure, and certain parts are broken away for clarity. Side guides for the shutter 16 are indicated at 102, 104.

In this form of the invention, no backing plate is provided for the shutter at the driving point, but instead there are two parallel driving rollers 106 and 108. These are journalled in respective bearing plates 110, 112 for the roller 106, and similar plates for the roller 108. Only one of the latter plates is visible in Fig. 5, and is designated 114. At one end, plates 112 and 114 are pivoted together as at 116 upon a stationary cross-piece 118, suitably mounted in the framework of the apparatus. The pairs of opposite plates such as 110 and 112 may be connected as by a bar or strut 120 so that they will move as a unit, to allow rollers 106, 108 to be moved toward and away from each other while maintaining their axes parallel.

Springs such as that indicated at 122 connect the plates 112 and 114, and the corresponding opposite pair, so as to urge the rollers 106, 108 towards one another, their common pinch plane being occupied by the shutter 16 carried in the guides 102, 104. The rollers 106, 108 are, between exposures, maintained out of contact with the shutter 16 as by a cam 124 arranged to urge apart respective pins fixedly secured to the plates. The cam 124 is so shaped that upon rotation it will at one point allow the plates 112 and 114 (and the corresponding ones at the other side of the shutter) to be urged together as by springs 122 to propel the shutter rapidly across the exposure aperture. A duplicate cam may be provided at the other side and connected for operation with cam 124.

Since rollers 106 and 108 must be rotated rapidly in opposite directions, and preferably at identical speed, suitable driving means have been provided. The drive includes a motor 126 connected to drive a pair of pulleys 128, 130 which have a common axle in alignment with (but not connected to) the cross-shaft 118. The shaft of each roller 106, 108 is extended to carry a respective pulley, one of these being shown at 132, connected as by a belt 134 to pulley 128. The other roller pulley 136 may be connected by a crossed belt 138 to motor pulley 130. In this way, the two rollers are constantly driven in opposite directions at the same speed, and without disturbing the drive continuity regardless of whether the rollers are swung apart or together. It will be noted that neither roller will act as a significant load for the other when they are in engagement after the shutter 16 has withdrawn its trailing edge from between them.

The above arrangement will provide an exposure upon film 14 each time the cam 124 is given a half turn. To avoid the necessity for capping the exposure area or closing the optical path by an auxiliary shutter when the shutter 16 is returned to its starting position, a novel arrangement and procedure are provided. Briefly, the procedure is to move the shutter 15 in the backward or reset direction in synchronism with the direction of film feed indicated by the arrow on the film. For this purpose, the film 14 is assumed to have usual edge perforations 140, and the shutter 16 is provided with a corresponding single perforation 142 which will lie in the same vertical plane as perforations 140 and hence will not impair the light occlusion of the shutter. A manual shutter-setting and film advancing knob is indicated at 144, and is arranged to slide upon a guide rod 146 having a keyway (or of non-circular section) to prevent rotation of the knob 144 about the axis of the rod. Thus, the knob 144 may be integral with a slide 148 keyed to the rod 146. An extending resilient finger 150 of slide 148 terminates in a pin 152 adapted in one position to pass through the perforation 142 of shutter 16 and into one of the perforations 140 of the film 14. However, pin 152 is normally maintained out of shutter perforation 142, for example by maintaining guide rod 146 for slight rotation in its bearings. One such bearing is shown at 154, and a spiral spring 156 connects this fixed bearing to the rod 146 to rotate slide 148 in the direction pulling pin 152 out of engagement with the shutter 16.

With the parts in the position shown in Fig. 5, and after completion of an exposure, knob 144 is depressed to raise pin 152 so that the latter will engage the shutter perforation 142. If perforation 142 is not directly above pin 152, the vertical resilience of arm 150 will nevertheless urge it in the upward direction. Keeping knob 144 thus depressed, it may be slid in the direction of the arrow adjacent the knob, and when pin 152 penetrates perforation 142 the shutter 16 will be picked up and carried back to its starting position. It is assumed that cam 124 has been properly operated to separate the drive rollers preparatory to this action. Pin 152 is long enough to pass through aperture 142 in the shutter, and also to engage one of the edge perforations 140 of the film. Thus, the film will be advanced concomitantly with the resetting of the shutter. Since the shutter movement required will normally exceed the length of film to be advanced, a fixed cam 158 is provided to deflect arm 150 downward out of engagement with the film perforation when the proper amount of film has been advanced. Pin 152 will, however, remain in the shutter aperture 142 for a sufficient travel to reset the shutter completely.

Figure 6:
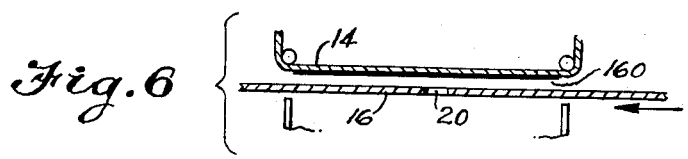
Fig. 6 is a schematic side view of the apparatus of Fig. 5, showing one phase in the exposure and film winding cycle.
Figure 7:
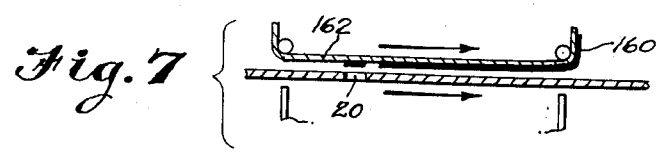
Fig. 7 is a view similar to Fig. 6 illustrating a later phase in the same cycle.

Figs. 6 and 7 illustrate the effect of the above procedure. In Fig. 6 the film 14 is stationary and the moving shutter slit 20 will expose a length on film 14 indicated by the heavy line 160. Fig. 7 illustrates the film and shutter being moved in synchronism in the opposite direction, with the slit 20 exposing only a narrow band 162 which will lie between successive exposure areas on the film.

It will ordinarily be necessary to provide a snubber, similar to those shown in Figs. 1 to 4, to stop the shutter element in the direction of its exposure travel in Fig. 5, and it is to be understood that such a snubber has been omitted from the latter figure only because it is adequately shown in the earlier form of the invention. Such snubber may, as in the previous case, be automatically lifted if desired before the shutter setting and film-advancing stroke is commenced.

It will be noted that the shutter element itself, in both forms of the invention, is sufficiently rigid to maintain its shape even under high accelerations, yet is thin and light for minimum mass. Thin spring steel is suitable, but equivalent materials can obviously be employed. Spring stock .002 inch thick has been found perfectly adequate with a drive roller speed as high as 8,000 revolutions per minute, which produces a linear travel (in the embodiment shown) of about 400 inches per second over the exposure aperture. For a shutter to occupy the available and usually restricted space in a camera, the preferred configuration of Fig. 1 produces a slight bend in the element at two points in its travel, and it is to be understood that this amount of bend is not intended to be excluded in referring to the element as relatively rigid, which terminology is intended to exclude truly flexible materials such as normally employed for shutter curtains. For good acceleration and deceleration, both the drive rollers and the snubbing brushes should have extensive contact widthwise of the shutter.

Various changes and modifications can be made in the structures shown herein without departing from the novel principles of the invention, and it is intended to include within the scope hereof all such changes as fall within the scope of the appended claims.

What is claimed is:

1. In a photographic shutter, a relatively elongated substantially rigid thin light-occluding sheet having an exposure aperture therein, a frictional drive roller mounted with its axis parallel to the plane of said sheet and perpendicular to the lengthwise dimension thereof, and with the roller surface normally spaced from contact with the adjacent sheet surface, means for driving said roller at a high peripheral speed, and control means for suddenly moving the rotating roller into frictional contact with the adjacent surface of said sheet to project the same, solely by such frictional engagement, impulsively across an exposure frame.

2. The combination in accordance with claim 1, including means adjacent the opposite surface of said sheet for maintaining the same substantially in a single plane against the thrust of said roller.

3. The combination in accordance with claim 1, including frictional snubbing means disposed adjacent the end of the path of travel of said sheet for frictionally and progressively engaging an increasing portion of the surface area of said sheet to decelerate and stop the same.

4. The combination in accordance with claim 3, in which said snubbing means comprises a brush having bristles extending across substantially the whole face width of said sheet, and extending a substantial distance in the direction of travel of the sheet.

5. The combination of claim 4, in which the bristles of said brush are inclined with their tips pointing away from the approach direction of the leading edge of said sheet.

6. A shutter for high-speed photographic cameras comprising parallel guides defining a shutter path therebetween, a relatively flat substantially rigid light-occluding element received in said guides for movement therein in a substantially rectilinear path across an exposure aperture, said element having an exposure slit arranged transverse to its travel path; a constantly rotating high speed, frictional drive roller mounted adjacent the path of said element for movement toward and away from the element selectively to project the latter across said exposure aperture, and means for suddenly urging said rotating roller into frictional surface engaging contact with one surface of said element to drive the latter in free flight across the aperture.

7. A photographic shutter in accordance with claim 6, including backing means adjacent the opposite surface of said element, and in alignment with said roller, for maintaining the shutter element substantially in a single plane against the thrust of the roller.

8. A photographic shutter in accordance with claim 7, in which said backing means comprises a plate grooved in parallel paths generally parallel to the travel direction of the shutter element, and in which said roller is peripherally grooved to provide lands matching the grooves of said plate; and means for limiting the movement of said roller towards said element to a distance in which the roller lands and the bottoms of the plate grooves are interdigitated but free of contact.

9. A photographic shutter comprising a one-piece relatively stiff light-occluding member having a central transverse slit therein, a framework, means mounting said member for reciprocation back and forth within said framework, while lying substantially in its own plane, to cause said slit to traverse a central exposure opening, friction drive rollers carried on said framework respectively on opposite sides of the exposure aperture to drive said element alternately in opposite directions, frictional motion snubbers carried on opposite sides of said aperture adjacent the path of said element to engage the surface of the same at its extremities of movement, and means mounting each roller and its corresponding snubber for concomitant removal of the snubber from the path of said element upon movement of the roller into driving engagement with the element.

References Cited in the file of this patent

UNITED STATES PATENTS

| | | |
|---|---|---|
| 983,021 | Bingham | Jan. 31, 1911 |
| 1,003,536 | Spinks | Sept. 19, 1911 |
| 2,391,274 | Schubert et al. | Dec. 18, 1945 |
| 2,444,446 | Jackson | July 6, 1948 |